US008386490B2

(12) United States Patent
Jiang et al.

(10) Patent No.: US 8,386,490 B2
(45) Date of Patent: Feb. 26, 2013

(54) ADAPTIVE MULTIMEDIA SEMANTIC CONCEPT CLASSIFIER

(75) Inventors: Wei Jiang, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 232 days.

(21) Appl. No.: 12/912,820

(22) Filed: Oct. 27, 2010

(65) Prior Publication Data

US 2012/0109964 A1    May 3, 2012

(51) Int. Cl.
G06F 7/00    (2006.01)
(52) U.S. Cl. ........................................ 707/739; 707/737
(58) Field of Classification Search .................. 707/739, 707/737
See application file for complete search history.

(56) References Cited

U.S. PATENT DOCUMENTS

2009/0299999 A1* 12/2009 Loui et al. ........................ 707/5
2011/0137910 A1*  6/2011 Hibino et al. ................ 707/741

OTHER PUBLICATIONS

Yu-Gang Jiang et al. "Domain Adaptive Semnatic Diffusion for Large Scale Context-based Video Annotation", 2009 IEEE.*
Active Context-Based Concept Fusion with Partial User Labels, W. Jiang, Shi-Fu Chang, Alexander Loui, IEEE ICIP, 2006.
Evaluation Campaigns and TRECVid, A. Smeaton, P. Over, W. Kraaij, ACM MIR, pp. 321-330, 2006.
Statistical Learning Theory, Vladimir N. Vapnik, Wiley-Interscience, New York, 1998.
Cross-Domain Video Concepts Detection Using Adaptive SVMs, J. Yangm, R. Yan, A. Hauptmann, ACM Multimedia, 2007.
Manifold Regularatization: A Geometric Framework for Learning from Labeled and Unlabeld Examples, M. Belkin, P. Niyogi, V. Sindhwani, Journal of Machine Learning Research 7 (2006) 2399-2434.
The mathematics of networks, M. E.J. Newman, Center for Study of Complex Systems, The New Palgrave Encyclopedia of Economics, 2nd Edition, L.E. Blume and S.N. Durlauf (eds.), Palgrave Macmillan, Basingstoke, 2008.
Support Vector Machine Active Leraning for Image Retrieval, S. Tong, E. Chang, ACM Multimedia, 2001.
Semi-Supervised Learning, O(. Chapelle, B. Scholkopf, A. Zien, The MIT Press, Cambridge, MA, 2006.
Kodak's Consumer Video Benchmark Data Set: Concept Definition and Annotation, A. Loui, J. Luo, S. chang, D. Ellis, W. Jiang, L. Kennedy, K. Lee, A. Yanagawa, ACM MIR, pp. 245-254, 2007.
Large Scale Multimodal Semantic Concept Detection for Consumer Video, s. Chang, D. Ellis, W. Jiang, K. Lee, A. Yanagawa, A. Loui, J. Luo.
The Google Similarity Distance, R. Cilibrasi, P. Vitanyi, IEEE Trans on Knowledge and Data Engineering, vol. 19, No. 3, Mar. 2007.

* cited by examiner

*Primary Examiner* — Cindy Nguyen
(74) *Attorney, Agent, or Firm* — Raymond L. Owens

(57) ABSTRACT

A method of classifying a set of semantic concepts on a second multimedia collection based upon adapting a set of semantic concept classifiers and updating concept affinity relations that were developed to classify the set of semantic concepts for a first multimedia collection. The method comprises providing the second multimedia collection from a different domain and a processor automatically classifying the semantic concepts from the second multimedia collection by adapting the semantic concept classifiers and updating the concept affinity relations to the second multimedia collection based upon the local smoothness over the concept affinity relations and the local smoothness over data affinity relations.

4 Claims, 8 Drawing Sheets

US 8,386,490 B2

ADAPTIVE MULTIMEDIA SEMANTIC CONCEPT CLASSIFIER

FIELD OF THE INVENTION

The present invention relates to adapting a set of semantic concept classifiers used with a first multimedia collection so that they can be used in a second multimedia collection.

BACKGROUND OF THE INVENTION

Rapidly increased amounts of multimedia data require automatic classification of a wide range of semantic concepts chosen to represent multimedia content, such as objects (e.g., car), scenes (e.g., sunset), events (e.g., birthday). Multimedia data are typically collected incrementally, e.g., images and videos captured at a person's birthday party are collected throughout different years. A newly acquired multimedia collection often has different data distribution than a previously acquired multimedia collection, e.g., they come from different groups of users, have changing characteristics from time to time. To classify a concept from a newly acquired multimedia collection traditional methods, such as [S. F. Chang, et al. Large-scale multimodal semantic concept detection for consumer video, ACM MIR, pages 255-264, 2007], solely rely on data from the current collection. First, a set of labeled data are obtained in the current collection, and then a classifier, such as an SVM developed in [V. Vapnik. Statistical Learning Theory. Wiley-Interscience, New York 1998], is trained by using the labeled data to classify the remaining data in the current collection. It is, in general, very expensive to obtain a large amount of labeled data from manual annotation, and the performance of the traditional semantic concept classifier is often limited by the small amount of labeled training data. In addition, the classifier will not work well for a future new multimedia collection due to the difference between the current and future collections.

SUMMARY OF THE INVENTION

The present invention represents a method for classifying a set of semantic concepts on a second multimedia collection based upon adapting a set of semantic concept classifiers and updating concept affinity relations that were developed to classify the set of semantic concepts for a first multimedia collection, including:

a) providing the second multimedia collection that is from a different domain than the first multimedia collection;

b) wherein two multimedia collections are from different domains means that data in these two collections have different distributions or characteristics, for example, a collection of broadcast news videos is from a different domain than a collection of consumer videos;

c) using a processor to automatically classify the semantic concepts from the second multimedia collection by adapting the semantic concept classifiers and updating the concept affinity relations to the second multimedia collection based upon the local smoothness over the concept affinity relations and the local smoothness over the data affinity relations;

d) wherein the concept affinity relation describes the similarity between the pair of semantic concepts and is computed by using some similarity metric;

e) wherein the data affinity relation describes the similarity between the pair of multimedia data and is computed by using some similarity metric with some feature;

f) wherein the local smoothness over the concept affinity relations includes a function to remain smooth over a weighted affinity graph connecting pairs of the semantic concepts and the weight over a graph edge is the concept affinity relation of the corresponding pair of concepts; and g) wherein the local smoothness over the data affinity relations includes a function to remain smooth over a weighted affinity graph connecting pairs of the multimedia data in the second multimedia collection and the weight over a graph edge is the data affinity relation of the corresponding pairs of multimedia data;

h) storing the adapted semantic concept classifiers and the updated concept affinity relations;

i) where step a) further includes automatically selecting a set of data-concept pairs to query users for annotation and step b) further includes using the annotated data-concept pairs to classify the semantic concepts from the second multimedia collection and to adapt the semantic concept classifiers and the concept affinity relations;

j) wherein selecting a set of data-concept pairs includes considering importance of the multimedia data defined over the data affinity relations and importance of the semantic concepts defined over the concept affinity relations.

This invention has the advantage that significant classification performance improvements can be achieved on classifying the second multimedia collection relative to prior art semantic concept classification techniques.

The advantages of practicing the method of the current invention further include:

a) the ability to apply to the second multimedia collection without the presence of annotated training data from the second multimedia collection;

b) the ability to incrementally adapt the semantic concept classifiers and update the concept affinity relations that are adapted and updated by using the second multimedia collection to be used on a third multimedia collection, and therefore to incrementally adapt the semantic concept classifiers and update the concept affinity relations according to incrementally acquired multimedia collections.

DETAILED DESCRIPTION

In the following description, some embodiments of the present invention will be described in terms that would ordinarily be implemented as software programs. Those skilled in the art will readily recognize that the equivalent of such software can also be constructed in hardware. Because image and video manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein can be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
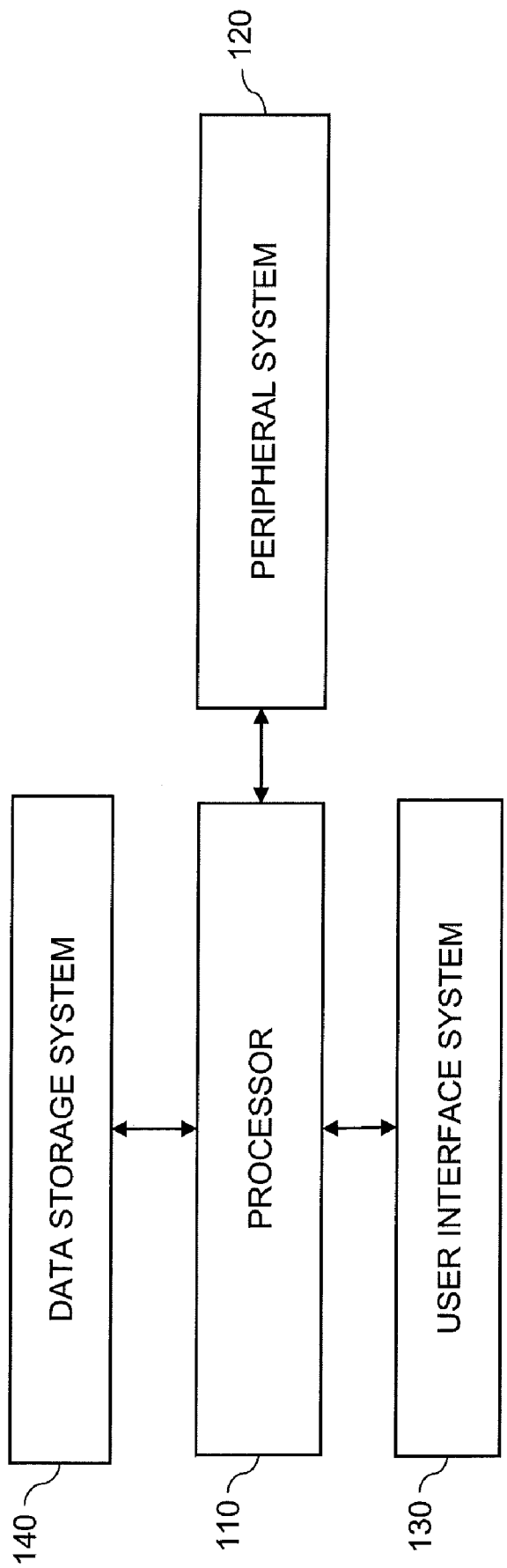
FIG. 1 is a high-level diagram showing the components of a system for classifying a multimedia collection according to an embodiment of the present invention.

FIG. 1 is a high-level diagram showing the components of a system for classifying a multimedia collection according to an embodiment of the present invention. The system includes a processor 110, a peripheral system 120, a user interface system 130, and a data storage system 140. The peripheral system 120, the user interface system 130 and the data storage system 140 are communicatively connected to the processor 110.

The processor 110 includes one or more data processing devices that implement the processes of the various embodiments of the present invention. The phrases "data processing device" or "processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the processor 110 via a plurality of computers or devices. On the other hand, the data storage system 140 need not be a distributed processor-accessible memory system and, consequently, can include one or more processor-accessible memories located within a single processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the processor 110, one skilled in the art will appreciate that the data storage system 140 can be stored completely or partially within the processor 110. Further in this regard, although the peripheral system 120 and the user interface system 130 are shown separately from the processor 110, one skilled in the art will appreciate that one or both of such systems can be stored completely or partially within the processor 110.

The peripheral system 120 can include one or more devices configured to provide digital content records to the processor 110. For example, the peripheral system 120 can include digital still cameras, digital video cameras, cellular phones, or other data processors. The processor 110, upon receipt of digital content records from a device in the peripheral system 120, can store such digital content records in the data storage system 140.

The user interface system 130 can include a mouse, a keyboard, another computer, or any device or combination of devices from which data is input to the processor 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the processor 110. In this regard, if the user interface system 130 includes a processor-accessible memory, such memory can be part of the data storage system 140 even though the user interface system 130 and the data storage system 140 are shown separately in FIG. 1.

The present invention addresses the challenging, practical issue of classifying a set of semantic concepts from a second multimedia collection where there are no or few annotated training data from users, based upon adapting a set of semantic concept classifiers that were developed to classify the set of semantic concepts for a first multimedia collection that is from a different domain than the second multimedia collection and updating concept affinity relations that are developed to describe the pairwise affinity relations between pairs of the semantic concepts.

Details of the Invention: No Annotation from the Second Multimedia Collection

A preferred embodiment of the invention where no annotated data is available from the second multimedia collection will now be discussed with reference to FIG. 2. A preferred embodiment of the invention where some annotated data are available from the second multimedia collection will be discussed later with reference to FIG. 3.

Figure 2:
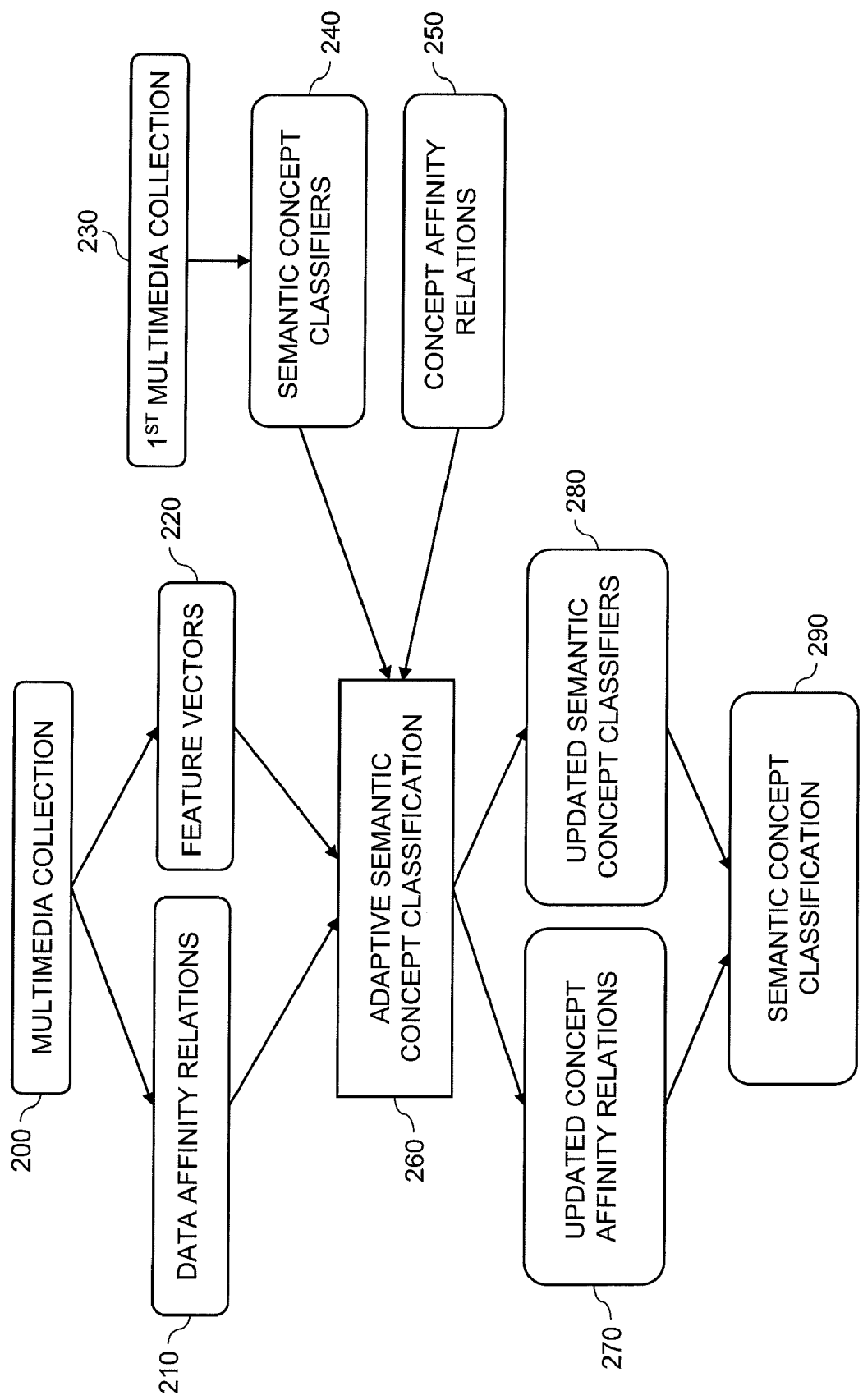
FIG. 2 is a flow diagram illustrating a preferred embodiment of the present invention where no users' annotation is available in the second multimedia collection.

For the preferred embodiment of the invention shown in FIG. 2 where no annotated data is available from the second multimedia collection, the input to the process is the second multimedia collection (X) block 200. The task is to classify a set of K semantic concepts $C_1, \ldots, C_K$ on X. There exists a first multimedia collection ($X^{old}$) block 230, which is from a different domain than collection X block 200. X and $X^{old}$ are from different domain means that data in these two multimedia collections have different distributions or characteristics. For example, $X^{old}$ is a collection of broadcast news videos and X is a collection of consumer videos. A set of semantic concept classifiers (represented by a set of parameters $\Theta^{old}$) block 240 have been developed using $X^{old}$ to detect the semantic concepts $C_1, \ldots, C_K$. A concept affinity matrix $W^{old}$ has been computed to capture the concept affinity relations block 250 based on some multimedia collection different from X, which can be $X^{old}$ or some multimedia collection other than $X^{old}$. The concept affinity relations block 250 describes the similarity between the pair of semantic concepts and is computed by using some similarity metric, for example, by using the Normalized Google Distance [R. Cilibrasi and P. Vitanyi. The Google similarity distance. IEEE Trans. Knowledge and Data Engineering, 19:370-383, 2007] described in Eqn. (19).

The semantic concept classifiers ($\Theta^{old}$) block 240 are developed to classify concepts in the first multimedia collection ($X^{old}$) block 230. To maintain this discriminative ability, the adapted set of new semantic concept classifiers ($\Theta^{new}$) block 280 are expected to be similar to $\Theta^{old}$. This is the same assumption used in some previous classifier adaptation methods such as the Adaptive SVM method developed in [J. Yang, et al. Cross-domain video concept detection using adaptive svms. ACM Multimedia, 2007]. Therefore, the first part of the joint cost function that the method reduces is the following:

$$\min_{\Theta^{new}} Q^s = \min_{\Theta^{new}} \|\Theta^{new} - \Theta^{old}\|_2^2 \qquad (1)$$

Kernel-based SVM classifiers that are developed by [V. Vapnik. Statistical Learning Theory. Wiley-Interscience, New York, 1998] have been shown effective in classifying generic semantic concepts in several data sets such as [A. Loui, et al. Kodak's consumer video benchmark data set: Concept definition and annotation, ACM MIR, pages 245-254, 2007; A. F. Smeaton, P. Over and W. Kraaij, Evaluation campaigns and TRECVid, ACM MIR, pages 321-330, 2006]. In this work, SVMs are also used as the semantic concept classifiers. According to the Representer Theorem [V. Vapnik. Statistical Learning Theory. Wiley-Interscience, New York, 1998], the discriminant function $f_k(x)$ learned from $X^{old}$ of a data sample $x \in X^{old}$ for a concept $C_k$ is given as:

$$f_k(x) = \sum_{x_i \in X^{old}} \mu_{ki} K(x_i, x) = K(x; X^{old}) u_k \qquad (2)$$

where $K(x_1, x_2)$ is the kernel function of two data samples $x_1$ and $x_2$, $K(x; X^{old})$ is a vector composed by kernel functions of x against data in $X^{old}$, and $u_k = [\mu_{k1}, \ldots, \mu_{kn^{old}}]^T$ where $n^{old}$ is the size of $X^{old}$. Define that $U^{old} = [u_1, \ldots, u_K]$. The $n^{old} \times K$ matrix $U^{old}$ contains the parameters learned from $X^{old}$ to produce discriminant functions for classifying the K concepts. The current goal is to learn a new $n^{old} \times K$ matrix $U^{new} = [\tilde{u}_1, \ldots, \tilde{u}_K]$ that is similar to $U^{old}$. That is, Eqn. (1) is rewritten to:

$$\min_{\Theta^{new}} Q^s = \min_{\Theta^{new}} \|U^{new} - U^{old}\|_2^2 \qquad (3)$$

The new discriminant function of classifying a data sample x for a concept $C_k$ is given by:

$$\tilde{f}_k(x) = K(x; X^{old}) \tilde{u}_k \qquad (4)$$

In order to use the large amount of unlabeled data $X_U$ from the second multimedia collection (X) block 200 to help classification, where $X_U = X$ here since there is no annotation available in X, the assumption of local data smoothness from [O. Chapelle, et al., Semi-supervised Learning, MIT Press, Cambridge, Mass., 2006] is incorporated, i.e., close-by data points in the feature space should have similar discriminant functions. The following describes the details of the local data smoothness assumption. Given X, a weighted undirected graph $G^d = (V^d, E^d, W^d)$ is formed to describe the pairwise similarities between each pair of data points, where $V^d$ is the vertices set and each node corresponds to a data point in X, $E^d$ is the set of edges connecting pairs of data points, and $W^d$ is the set of weights assigned to $E^d$ and each entry $W^d_{ij}$ measures the strength of the similarity, i.e., the data affinity relation block 210 between the corresponding pair of data points $x_i$ and $x_j$. The similarity is computed by using some similarity metric based upon the feature vectors block 220 of data points. Let $\tilde{F} = [\tilde{f}_1^d, \ldots, \tilde{f}_{n+n_U}^d]^T$ represent the discriminant functions of the entire data collection X over K concepts, where each $\tilde{f}_i^d = [\tilde{f}_1(x_i), \ldots, \tilde{f}_K(x_i)]^T$ includes discriminant functions over a datum $x_i$, and $d_i^d$ is the degree of graph $G^d$ over node $x_i$. The local data smoothness assumption is described by the following cost function:

$$\min_{\tilde{F}} Q^d = \min_{\tilde{F}} \frac{1}{2} \sum_{x_i, x_j \in X^{old}} W^d_{ij} \left\| \frac{\tilde{f}_i^d}{\sqrt{d_i^d}} - \frac{\tilde{f}_j^d}{\sqrt{d_j^d}} \right\|_2^2 \qquad (5)$$

Eqn. (5) is the second part of the joint cost function the method reduces. Define $L^d$ as the normalized graph Laplacian matrix:

$$L^d = I - D^{d-1/2} W^d D^{d-1/2} \qquad (6)$$

where $D^d$ is the diagonal matrix whose entries are row sums of $W^d$: $D^d_{ij} = \sum_j W^d_{ij}$.

By substituting Eqn. (4) into Eqn. (5), one can obtain:

$$\min_{U^{new}} Q^d = \min_{U^{new}} Q^d \frac{1}{2} tr\{U^{newT} K(X^{old}; X) L^d K(X; X^{old}) U^{new}\} \qquad (7)$$

where $K(X; X^{old})$ is the kernel matrix of data collection X against data collection $X^{old}$, and $K(X; X^{old}) = K(X^{old}; X)^T$.

In practice, semantic concepts do not occur in isolation. Multi-concept learning aims to use the relationships among concepts, e.g., the concept affinity relations, to help classify individual concepts. In order to use concept affinity relations, the assumption of local smoothness over the concept affinity graph is adopted, i.e., two concepts having high similarity defined in the concept affinity graph have similar concept classification results over data samples. The following describes the details of this assumption. Given K semantic concepts $C_1, \ldots, C_K$, an undirected graph $G^c=(V^c, E^c, W^{c,old})$ is defined to capture semantic concept affinity relations. $V^c$ is the vertices set and each node corresponds to a concept. $E^c$ is the set of edges and each edge connects a pair of concepts. $W^{c,old}$ is the concept affinity matrix, where each entry $W^{c,old}_{kl}$ gives the weight of the edge between concepts $C_k$ and $C_l$, which measures the similarity between these two concepts. $W^{c,old}$ is computed based upon some multimedia collection that is different from X. This multimedia collection can be $X^{old}$ and can be another multimedia collection different from $X^{old}$.

Define the normalized graph Laplacian matrix $L^{c,old}$:

$$L^{c,old} = I - (D^{c,old})^{-1/2} W^{c,old} (D^{c,old})^{-1/2} \quad (8)$$

where $D^{c,old}$ is a diagonal matrix whose entries are row sums of $W^{c,old}$: $D_{kk}^{c,old} = \Sigma_l W_{kl}^{c,old}$. Let F denote the discriminant function over the entire collection X for the concepts, i.e., $F=[f_1^c, \ldots, f_K^c]$ where each $f_k^c = [f_k(x_1), \ldots, f_k(x_{n_l+n_U})]^T$ is the discriminant function over X for a concept $C_k$. The assumption of local smoothness over the concept affinity graph is described by following cost function:

$$\min_{\tilde{F}, W^{c,new}} Q^{DASD} = \min_{\tilde{F}, W^{c,new}} \frac{1}{2} tr(\tilde{F}^T L^{c,new} \tilde{F}) \quad (9)$$

where $W^{c,new}$ is the updated concept affinity matrix block 270.

By substituting Eqn. (4) into Eqn. (9), the following cost function is obtained:

$$\min_{U^{new}, W^{c,new}} Q^c = \quad (10)$$

$$\min_{U^{new}, W^{c,new}} \frac{1}{2} tr\{K(X; X^{old}) U^{new} L^{c,new} U^{newT} K(X^{old}; X)\}$$

Eqn. (10) is the third part of the joint cost function this invention reduces, where $L^{c,new}$ is the normalized graph Laplacian:

$$L^{c,new} = I - (D^{c,new})^{-1/2} W^{c,new} (D^{c,new})^{-1/2} \quad (11)$$

$D^{c,new}$ is the diagonal matrix whose entries are row sums of matrix $W^{c,new}$: $D_{kk}^{c,new} = \Sigma_l W_{kl}^{c,new}$.

Now, three cost functions, Eqn. (3), Eqn. (7), and Eqn. (10) are combined into a joint cost function to be reduced by the present invention:

$$\min_{U^{new}, W^{c,new}} Q = \min_{U^{new}, W^{c,new}} \left[ \|U^{new} - U^{old}\|_2^2 + \right. \quad (12)$$

$$\frac{\lambda^d}{2} tr\{U^{newT} K(X^{old}; X) L^d K(X; X^{old}) U^{new}\} +$$

$$\left. \frac{\lambda^c}{2} tr\{K(X; X^{old}) U^{new} L^{c,new} U^{newT} K(X^{old}; X)\} \right]$$

Through optimizing Q the updated parameter matrix $U^{new}$ is obtained. $U^{new}$ constructs the updated concept classifiers to classify K concepts, and the updated concept affinity matrix $W^{c,new}$. In the following, an iterative algorithm is developed to optimize Q over $U^{new}$ and $W^{c,new}$ that will monotonically reduce the cost by coordinate descent towards a local minimum, corresponding to block 260 in FIG. 4.

Step 1: Optimization with Fixed $W^{c,new}$

Figure 4:
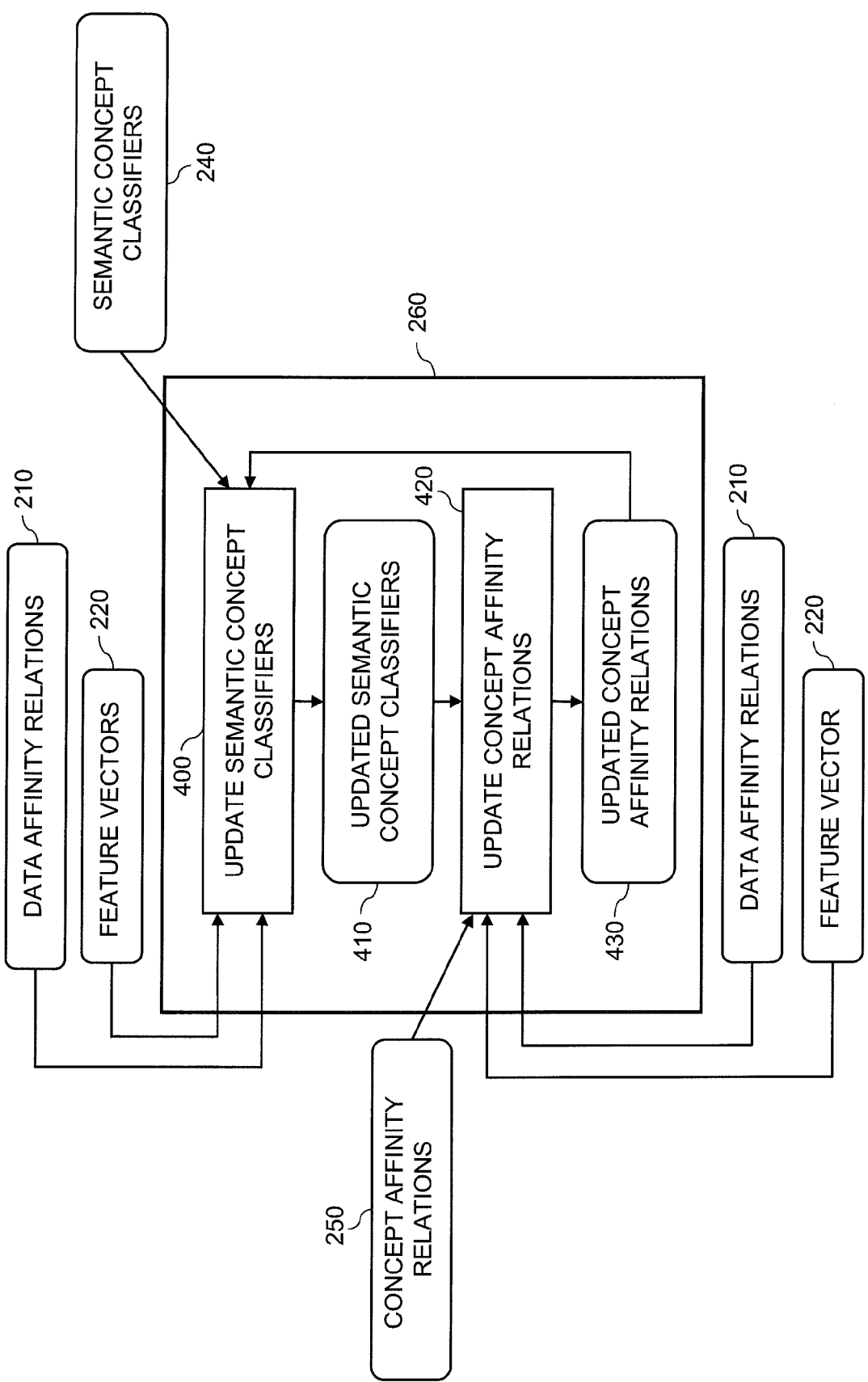
FIG. 4 shows a more detailed block diagram of the processing block 260 in FIG. 2 for adapting semantic concept classifiers and concept affinity relations.

The process of this step corresponds to block 400 in FIG. 4. When $W^{c,new}$ is fixed, by taking the derivative of cost Q with respect to $U^{new}$, one can obtain:

$$\frac{\partial Q^{LAC-SVM}}{\partial U^{new}} = 2U^{new} - 2U^{old} + \lambda^d K(X^{old}; X) L^d K(X; X^{old}) U^{new} + \quad (13)$$

$$\lambda^c K(X^{old}; X) K(X; X^{old}) U^{new} L^{c,new}$$

Then, the updated $U^{new}$ block 410 is learned by gradient descent as:

$$U^{new}(t) = U^{new}(t-1) - \alpha_U \frac{\partial Q^{LAC-SVM}}{\partial U^{new}(t-1)} \quad (14)$$

where $\alpha_U$ determines the step size for updates.

Step 2: Optimization with Fixed $U^{new}$

The process of this step corresponds to block 420 in FIG. 4. When $U^{new}$ is fixed, Eqn. (12) reduces to:

$$\min_{W^{c,new}} \tilde{Q} = \min_{W^{c,new}} tr\{K(X; X^{old}) U^{new} L^{c,new} U^{newT} K(X^{old}; X)\} \quad (15)$$

s.t. $W^{c,new} \geq 0$

By introducing a Lagrangian multiplier ç and taking the derivative of Eqn. (15) with respect to $W^{c,new}$, one can obtain:

$$\frac{\partial \tilde{Q}}{\partial W^{c,new}} = 0 \Rightarrow \varsigma = -(D^{c,new})^{-\frac{1}{2}} \tilde{F}^T \tilde{F} (D^{c,new})^{-1/2} \quad (16)$$

$$\tilde{F} = K(X; X^{old}) U^{new} \quad (17)$$

$\tilde{F}$ in Eqn. (17) includes the discriminant functions over data collection generated by updated parameter matrix $U^{new}$ for classifying K concepts. That is, Eqn. (17) describes the detailed process of getting semantic concept classification block 290.

According to the Karush-Kuhn-Tucker condition, for each entry $W_{kl}^{c,new}$:

$$[(D^{c,new})^{-1/2} \tilde{F}^T \tilde{F} (D_{c,new})^{-1/2}]_{kl} W_{kl}^{c,new} = 0$$

Define A, A+ and A− as follows:

$$A = (D^{c,new})^{-1/2} \tilde{F}^T \tilde{F} (D^{c,new})^{-1/2}$$

$$A_{kl}^+ = (|A_{kl}| + A_{kl})/2, \ A_{kl}^- = (|A_{kl}| - A_{kl})/2$$

Then the following updating formula is obtained to get $W_{kl}^{c,new}$:

$$W_{kl}^{c,new} \leftarrow W_{kl}^{c,new} \sqrt{(A_{kl}^+/(A_{kl}^-)} \quad (18)$$

The updating formula described in Eqn. (18) can converge to the global optimal.

Now, with the above two optimization steps, the detailed algorithm of the preferred embodiment of the present invention where no users' annotation is available in the second multimedia collection is summarized as follows:

Algorithm: Preferred Embodiment of the Present Invention without Annotation from the Second Multimedia Collection Input: The set of concept classifiers block 240 that are defined by a set of parameters $U^{old}$ to classify K semantic concepts, and the concept affinity relations block 250 defined by the concept affinity matrix $W^{c,old}$. The second multimedia collection (X) block 200.

1. Choose a kernel function to compute $K_{ij}=K(x_i, x_j)$, e.g., RBF kernel $K(x_i, x_j)=e^{-\theta\|x_i-x_j\|_2^2}$.
2. Construct data adjacency graph $G^d$ over X using kn nearest neighbors. Set edge weights $W_{ij}^d$ based on the kernel matrix described in step 1. Then compute the normalized graph Laplacian $L^d$ according to Eqn. (6).
3. Initialization: set $U_0^{new}=U^{old}$, and $W_0^{c,new}=W^{c,old}$.
4. Iteration to compute adapted concept classifiers and updated concept affinity relations corresponding to block 260: for $\tau=1,\ldots,\Gamma$
   a. Initialization: set $U^{new}(0)=U_{\tau-1}^{new}$.
   b. Calculate the updated $U^{new}(T_1)$ block 410 through gradient descent using Eqn. (14) with $T_1$ iterations in total. Then set $U_\tau^{new}=U^{new}(T_1)$.
   c. Calculate the updated $W_\tau^{c,new}$ block 430 using Eqn. (18) with $T_2$ iterations.

Output: The adapted concept classifiers block 280 defined by parameters $U_\Gamma^{new}$ for classifying K concepts, and the adapted concept affinity relations block 270 defined by matrix $W_\Gamma^{c,new}$.

Various types of distances are used to compute the concept affinity relations $W^{c,old}$. The Normalized Google Distance (NGD) [R. Cilibrasi and P. Vitanyi. The Google similarity distance. IEEE Trans. Knowledge and Data Engineering, 19:370-383, 2007] over the first multimedia collection $X^{old}$ is used in this description as an example. That is, given two concepts $C_k$ and $C_l$, the corresponding entry $W_{kl}^{c,old}$ is computed as:

$$W_{kl}^{old} = \exp\{-NGD(C_k, C_l)/\pi\}, \quad (19)$$

$$NGD(C_k, C_l) = \frac{\max\{\log h(C_k), \log h(C_l)\} - \log h(C_k, C_l)}{\log n^{old} - \min\{\log h(C_k), \log h(C_l)\}},$$

where $h(C_k)$ is the number of data samples containing concept $C_k$, $h(C_k,C_l)$ is the number of data samples containing both concept $C_k$ and $C_l$, and $\pi$ is the average of all pairwise NGDs over the semantic graph.

Details of the Invention: with Annotation from the Second Multimedia Collection

Figure 3:
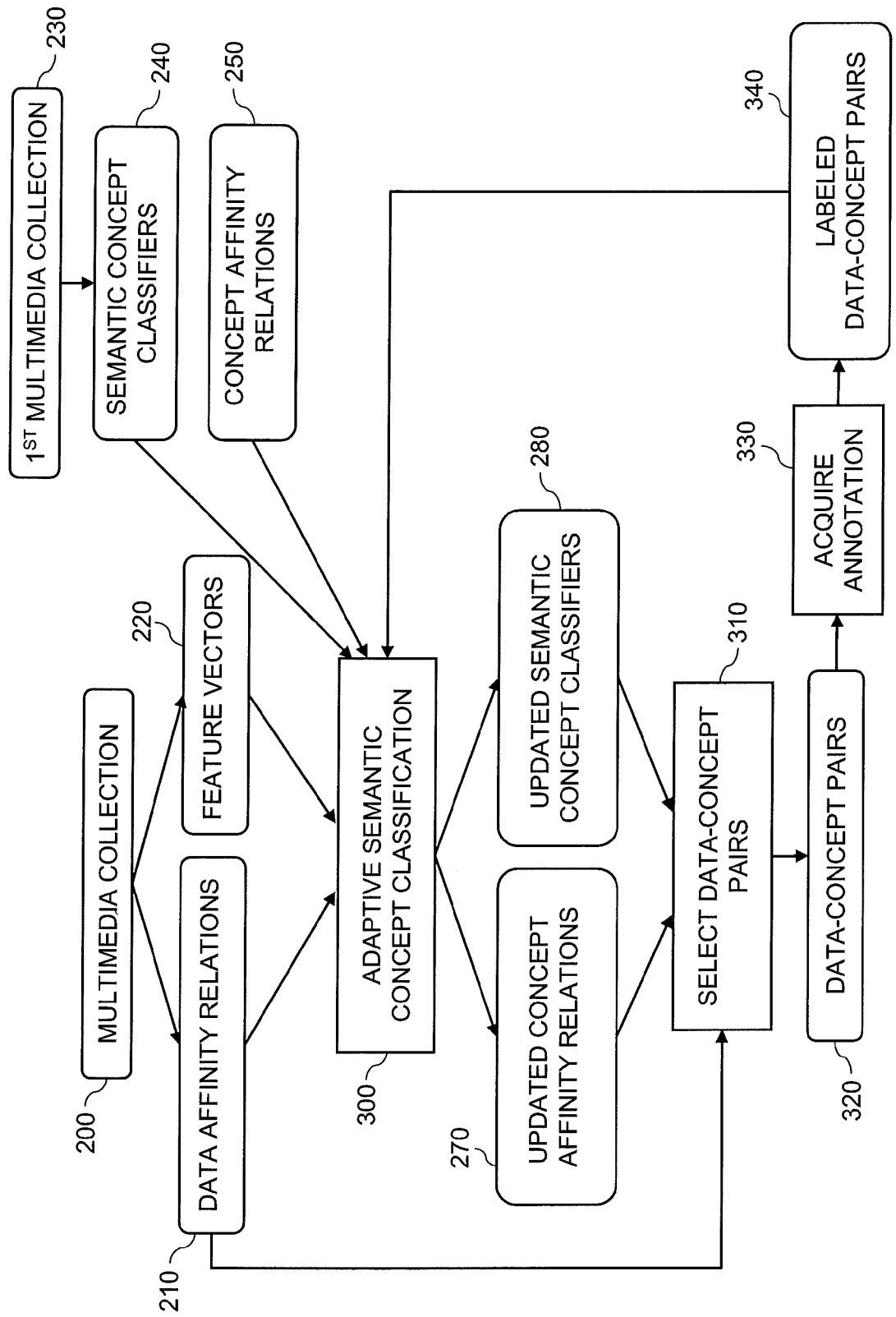
FIG. 3 is a flow diagram illustrating a preferred embodiment of the present invention where users' annotation is available in the second multimedia collection.

A preferred embodiment of the invention where some annotated data are available from the second multimedia collection will now be discussed with reference to FIG. 3. Let $X_L$ denote a subset of data, with size $n_L$, that are annotated by users in the second multimedia collection, and $X_U$ denotes a subset of data, with size $n_U$ that are unlabeled in the second multimedia collection. Therefore, $X=X_L \cup X_U$. Each data point $x_i \in X_L$ is associated with a set of class labels $y_{ik}$, $k=1,\ldots,K$, where $y_{ik}=1,\ldots,-1$ or $0$. $y_{ik}=1$ or $-1$ indicates the appearance or absence of concept $C_k$ in $x_i$ labeled by the user, and $y_{ik}=0$ indicates that $x_i$ is not labeled with respect to $C_k$. That is, for each $x_i \in X_L$, the user does not necessarily provide a full set of annotation to the K concepts. This is a common situation in reality because users commonly annotate only a few concepts to a datum, which they think are important to describe the content of the datum. Unless they are required to do so, users normally do not provide full annotation due to the burden of manual labeling.

An intuitive, traditional way of using the annotated data is to combine $X_L$ with $X^{old}$ and retrain classifiers. However retraining classifiers is computationally intensive. Also, users can provide annotations incrementally. It is important to be able to incrementally adapt $\Theta^{old}$ according to users' new annotations without retraining classifiers over data collections.

The algorithm "Algorithm: preferred embodiment of the present invention without annotation from the second multimedia collection" is naturally extended to include new labeled data as follows. The labeled data $X_L$ are added into the set of support vectors where a set of parameters $u_i^{new} = j[\mu_{1i}^{new},\ldots,\mu_{Ki}^{new}]^T$ are assigned to each data sample $x_i^{new} \in X_L$:

$$\mu_{ki}^{new} = \begin{cases} \eta \cdot \min_i(\mu_{ki}), & y_{ki}^{new} = -1 \\ y_{ki}^{new} \cdot \max_i(\mu_{ki}), & \text{others} \end{cases} \quad (20)$$

Parameter $\mu_{ki}$ is the parameter in original $U^{old}$, and $0 \leq \eta \leq 1$ is a weight added to the negative new labeled samples. Due to the unbalancing between positive and negative samples in some real applications, i.e., negative samples significantly outnumber positive ones for some semantic concepts, positive and negative samples need to be treated unequally.

Figure 5:
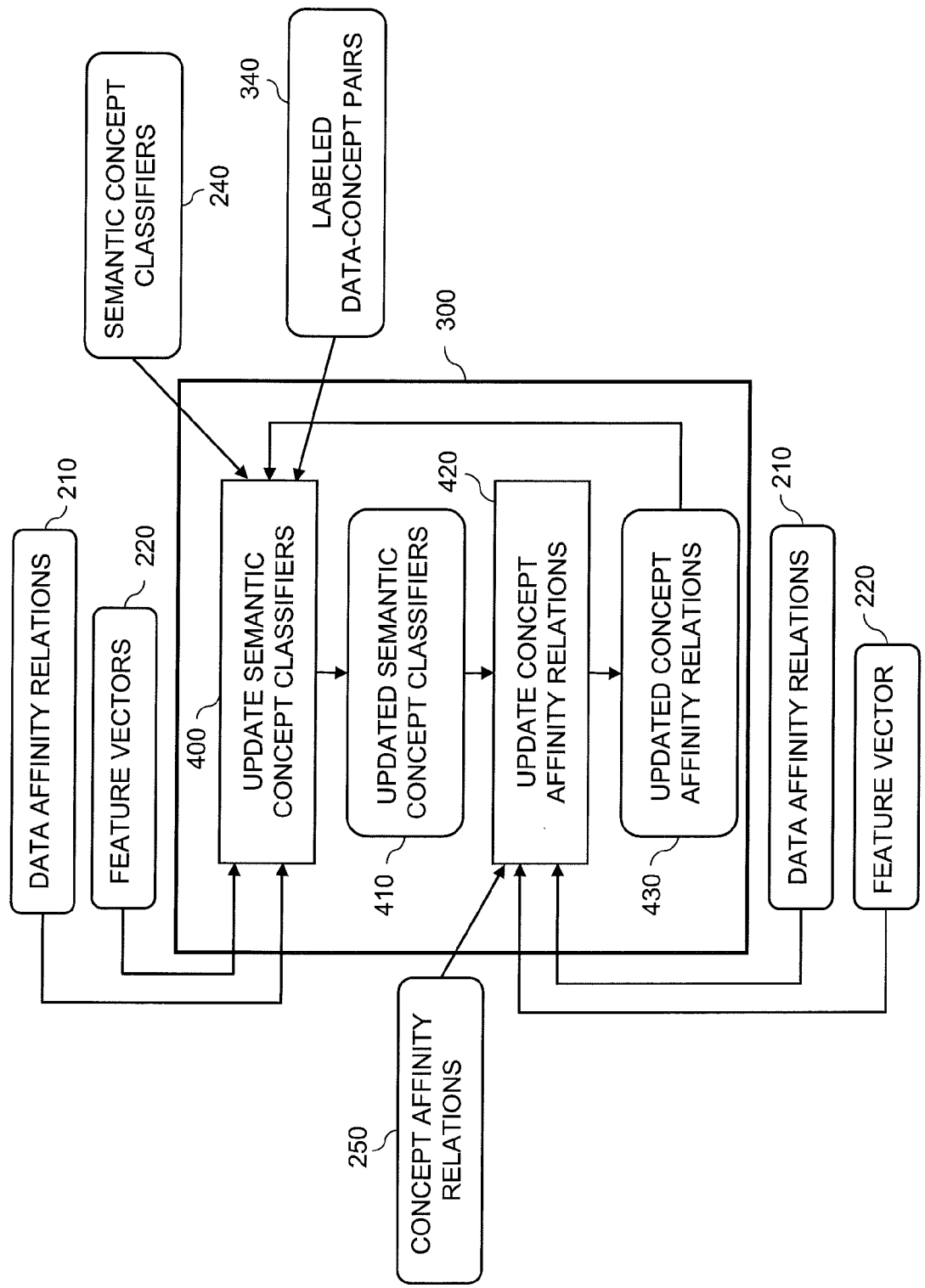
FIG. 5 shows a more detailed block diagram of the processing block 300 in FIG. 3 for adapting semantic concept classifiers and concept affinity relations.

Define $U^L=[u_1^{new},\ldots,u_{n_L}^{new}]$. The new amended parameter matrix $\hat{U}^{old}=[U^{oldT},U^{LT}]^T$ is obtained. The algorithm described in "Algorithm: preferred embodiment of the present invention without annotation from the second multimedia collection" is used directly to learn the adapted concept classifiers $U^{new}$ and updated concept affinity matrix $W^{c,new}$, by replacing $U^{old}$ with $\hat{U}^{old}$ corresponding to block 300 in FIG. 5.

In traditional passive annotation, for each concept, the system randomly selects some data from the new domain for the user to label. In order to improve the efficiency of users' annotation, an active selection mechanism is developed to choose a set of informative data-concept pairs block 320, i.e., data with associated concepts to be labeled by users, so that the entire data set from the new domain is better classified to various concepts. Active learning has been used to select informative data samples per concept [S. Tong and E. Chang. Support vector machine active learning for image retrieval. ACM Multimedia, 2001] or informative concepts [W. Jiang, et al. Active context-based concept fusion with partial user labels. IEEE ICIP, 2006] per data sample, respectively. Different from these works, this invention studies active selection of data-concept pairs block 320.

Figure 6:
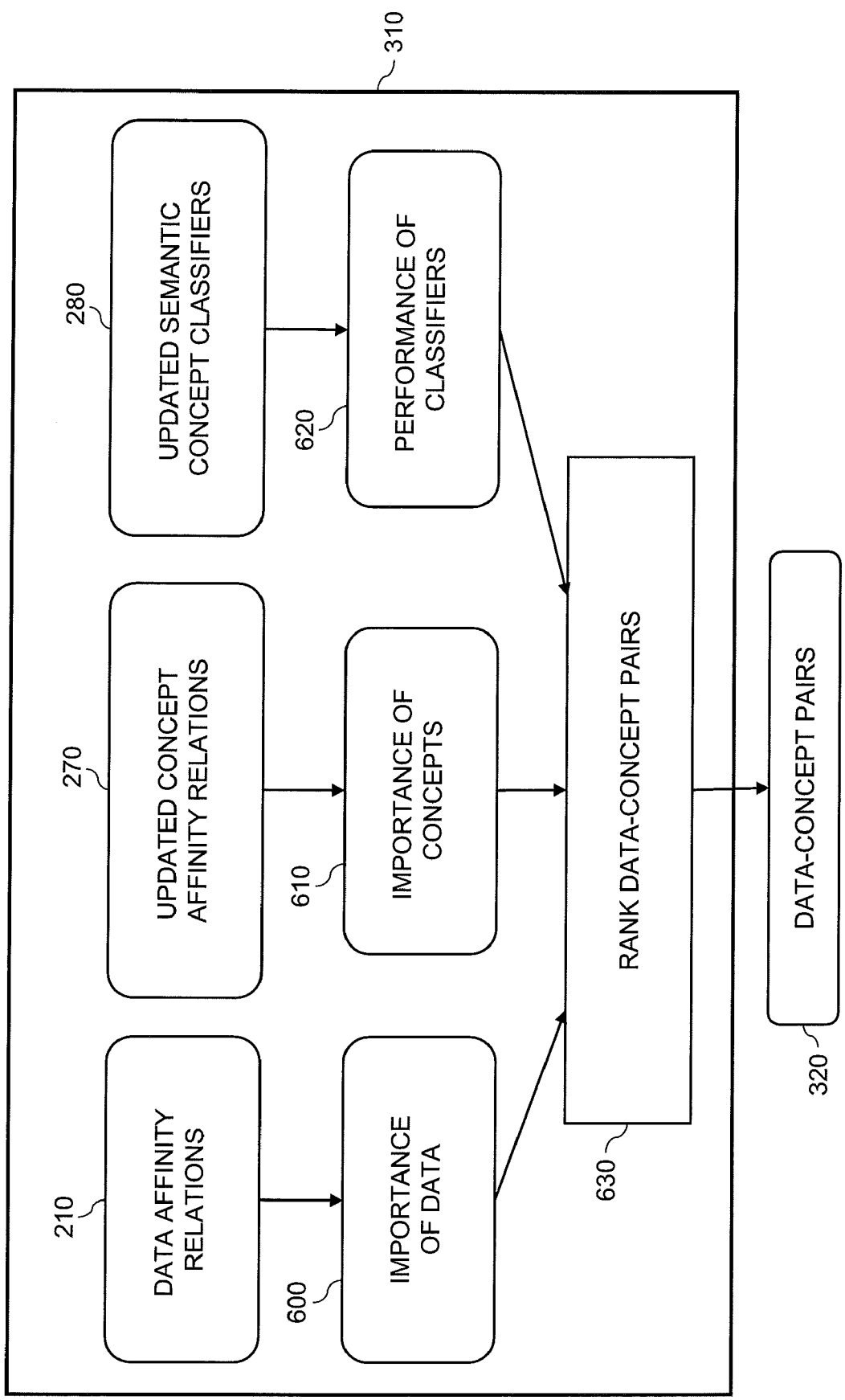
FIG. 6 shows a more detailed block diagram of the processing block 310 in FIG. 3 for selecting data-concept pairs.

A preferred embodiment of the data-concept selection method block 310 will now be discussed with reference to FIG. 6. The EigenVector Centrality (EVC) [M. Newman, Mathematics of Networks, The New Palgrave Encyclopedia of Economics, 2nd Edition, L. E. Blume and S. N. Durlauf (eds.), Palgrave Macmillan, Basingstoke, 2008] over a graph is widely used to measure the importance of graph nodes. Given a graph G=[V,E,W], the EVC of graph vertices V is described as follows: the eigenvector s corresponding to the largest eigenvalue of the following eigenvalue problem gives the importance of vertices on the graph:

$$Ws = \lambda s \quad (21)$$

Based on this, the importance of data samples ($s^d$) block 600 in X is obtained by eigendecomposition of the data affinity matrix $W^d$. Also, the importance of semantic concepts ($s^c$) block 610 is obtained by eigendecomposition of the concept affinity matrix $W^c$.

In addition to the importance scores $s^d$ and $s^c$, several other factors should also be considered to determine the importance of data-concept pairs. The first factor is how much a data-concept pair can benefit from the user's annotation. Intuitively, if an automatic concept classifier is able to give accurate prediction and also, this classifier is confident about its prediction over a particular datum, its prediction is treated as reliable and the user should not waste his/her annotation on this data-concept pair. Typically the performance of the concept classifiers in the first multimedia collection is measured, e.g., through cross-validation over $X^{old}$. Let $p_k$ denote the accuracy of the concept classifier to detect a concept $C_k$. Let $q_{ki}$ denote the confidence of the concept classifier to detect $C_k$ from a particular datum $x_i$. The value $q_{ki}$ is determined by the distance $\delta_{ki}$ between this datum to the decision boundary of this classifier, i.e., $q_{ki}=1/(1+\exp(-\delta_{ki}))$. Then a $K \times n^{new}$ matrix S is constructed where each entry $S_{ki}=(1-p_k)/q_{ki}$ measures the performance of the concept classifier over a single datum block 620, i.e., how much a data-concept pair $(C_k, x_i)$ needs help from the user's annotation ($n^{new}$ is the size of X in the new domain). Define matrix $\ddot{S}$ where each entry $\ddot{S}_{ki}$ is given by:

$$\ddot{S}_{ki}=S_{ki} \cdot s_i^d + \sigma \ddot{S} \cdot s_k^c, \quad (22)$$

where $s_i^d$ is the EVC importance of $x_i$ in $s^d$, and $s_k^c$ is the EVC importance of $C_k$ in $s^c$. The first term $S_{ki} \cdot s_i^d$ measures the importance of a data-concept pair $(C_k, x_i)$ when different concepts are treated equally. $\ddot{S}_{ki}$ gives the final importance of the pair $(C_k, x_i)$. The value $\sigma$ is a preset weight parameter. In block 630 of FIG. 6, entries of matrix $\ddot{S}$ can be ranked in descending order and the top M pairs are selected. Then in block 330 (FIG. 3) these M data-concept pairs are presented to the user for annotation and M labeled data-concept pairs block 340 (FIG. 3) are obtained.

Now, with both the adaptive concept classifiers and concept affinity relations updating method and the data-concept pairs selection method, the detailed algorithm of the preferred embodiment of the present invention where there are users' annotations available in the second multimedia collection summarized as follows. The algorithm also gives an effective framework of gradually adapting old classifiers and concept affinity relations to the second multimedia collection with incrementally acquired new labeled data:

Algorithm: Preferred Embodiment of the Present Invention with Incrementally Acquired New Labeled Data from the Second Multimedia Collection Input: The set of semantic concept classifiers block 240 that are defined by a set of parameters $U^{old}$ to classify K semantic concepts and the concept affinity relations block 250 defined by the concept affinity matrix $W^{c,old}$. The second multimedia collection (X) block 200.

1. Initialization: Set $X_U=X$, $X_L=\phi$, $W^{c,new}=W^{c,old}$.
2. Construct the data affinity matrix $W^d$ according to step 1 and 2 in the algorithm "Algorithm: preferred embodiment of the present invention without annotation from the second multimedia collection".
3. Iteration for incremental learning:
    a. Compute data importance vector $s^d$ and concept importance vector $s^c$ by eigendecomposition of $W^d$ and $W^{c,new}$, respectively.
    b. Construct the score matrix $\ddot{S}$ according to Eqn. (22). Select the optimal data-concept pairs block 320 for the user to label, by ranking entries in $\ddot{S}$ in descending order and avoiding those pairs $(C_k, x_i)$ where $x_i^{new} \in X_L$ and $y_{ik}^{new} \neq 0$.
    c. Provide the data-concept pairs block 320 for the user to label, and move the labeled data from $X_U$ to $X_L$.
    d. Generate $U^L$ according to Eqn. (20). Generate $\hat{U}^{old}=[U^{oldT}, U^{LT}]^T$, and set $\hat{W}^{c,old}=W^{c,new}$
    e. Learn adapted $U^{new}$ and $W^{c,new}$ by the algorithm in FIG. 2 where we replace $U^{old}$ by $\hat{U}^{old}$ and replace $W^{c,old}$ by $\hat{W}^{c,old}$, corresponding to clock 300.
    f. Set $U^{old}=U^{new}$ Output: The adapted concept classifiers block 280 defined by parameters $U^{new}$ for classifying K concepts, and the adapted concept affinity relations block 270 defined by matrix $W^{c,new}$.

A computer program product for practicing the method according to the present invention can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store an executable computer program having instructions for controlling one or more computers.

EXAMPLES

The following describes two examples of performance evaluation of the present invention. Both the algorithm "Algorithm: preferred embodiment of the present invention without annotation from the second multimedia collection" and the algorithm "Algorithm: preferred embodiment of the present invention with incrementally acquired new labeled data from the second multimedia collection" are evaluated over two sets of experiments using three different data sets, i.e., the TRECVID 2007 development data set [A. F. Smeaton, P. Over and W. Kraaij, Evaluation campaigns and TRECVid, ACM MIR, pages 321-330, 2006], Kodak's consumer benchmark video set [A. Loui, et al. Kodak's consumer video benchmark data set: Concept definition and annotation. ACM MIR, pages 245-254, 2007], and a large-scale consumer video set from Kodak's newer video asset.

The first example evaluates the algorithm by adaptively applying classifiers trained using TRECVID 2007 development data to Kodak's consumer benchmark videos. With the ground-truth annotations over both data sets, the algorithm is fully evaluated in this experiment. The second example is to adaptively apply classifiers trained using TRECVID 2007 development data to the large-scale consumer videos from Kodak's newer video asset, where the incremental learning ability is evaluated. For all experiments, a global visual feature is used that is generated by concatenating the following three features: grid-based color moments over 5×5 image grids, Gabor texture, and edge direction histogram.

Example 1

TRECVID 2007 to Kodak's Benchmark

Figure 7:
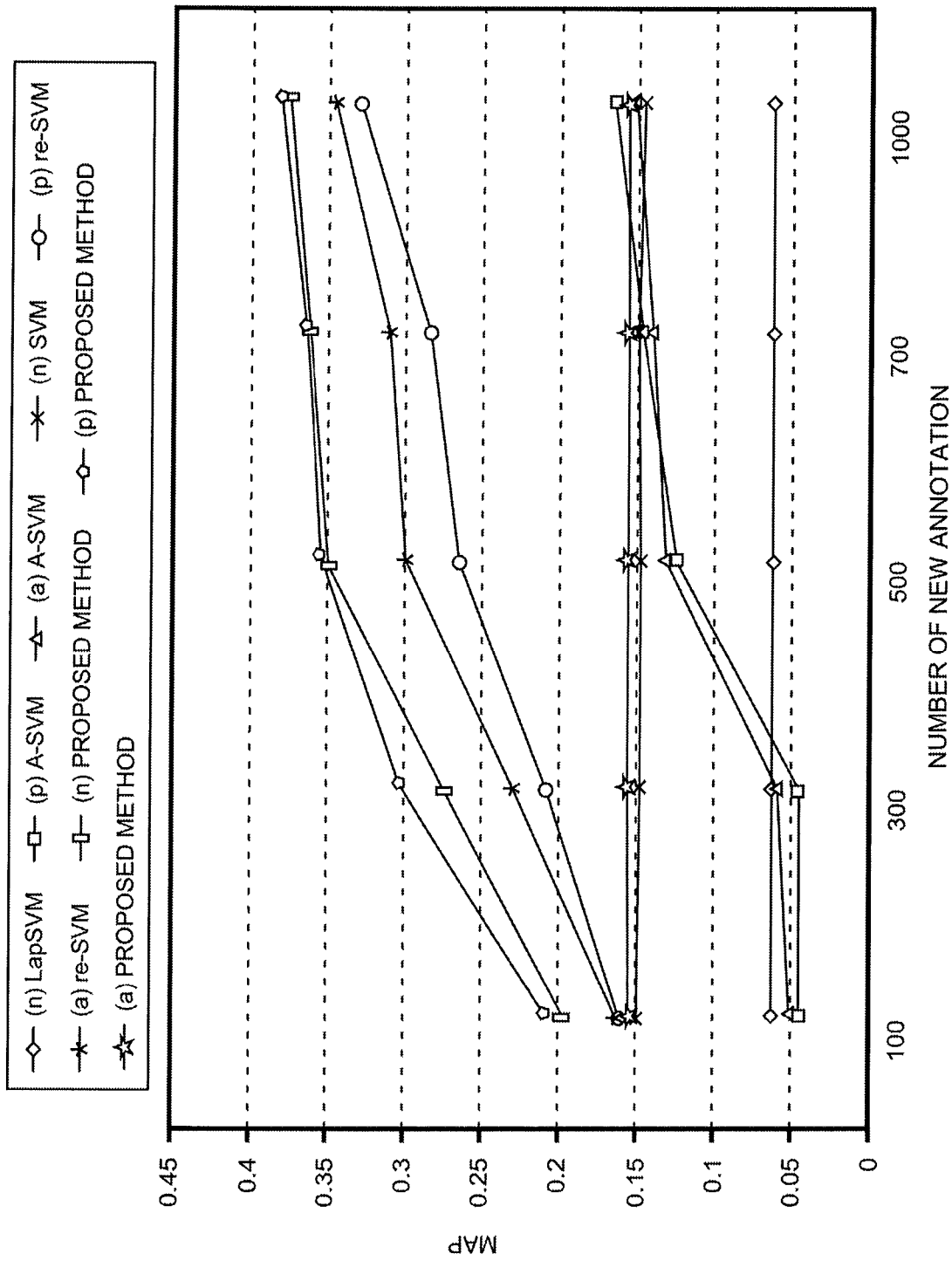
FIG. 7 shows the MAP comparisons of the present invention and some other state-of-the-art alternatives where the first multimedia collection is the TRECVID 2007 development video set and the second multimedia collection is Kodak's consumer benchmark video set.

Three scenarios are evaluated in this example where there is no new labeled data (that corresponds to the algorithm "Algorithm: preferred embodiment of the present invention without annotation from the second multimedia collection"), there is passively labeled data, or there is actively labeled data (that corresponds to the algorithm "Algorithm: preferred embodiment of the present invention with incrementally acquired new labeled data from the second multimedia collection"), from Kodak's consumer set. Algorithms in these three scenarios are marked by "(n)", "(p)", and "(a)", respectively. The algorithms of this invention are compared with the LapSVM method developed in [M. Belkin, et al. Manifold regularization: a geometric framework for learning from labeled and unlabeled examples. Journal of Machine Learning Research, 7(11):2399-2434, 2006], the original SVM classifiers (directly applying SVMs from the TRECVID 2007 data to Kodak's benchmark data), retrained SVM classifiers ("re-SVM") where labeled data from both the TRECVID 2007 data set and Kodak's benchmark data set are used to train the classifiers, and the A-SVM method developed in [J. Yang, et al. Cross-domain video concept detection using adaptive svms. ACM Multimedia, 2007]. FIG. 7 gives the overall Mean Average Precision (MAP) comparisons. The figure clearly shows that the invention consistently outperforms other alternatives in each scenario with no new annotation or increased number of new annotations acquired passively or actively. In addition, the method with active annotation outperforms that with passive annotation. The advantage is obvious when the user only provides a small number of annotations, e.g., one or three hundreds, annotated data-concept pairs that amount to a 0.4% (or 1.2%) annotation rate of Kodak's data in the new domain. With only 100 active annotations the overall MAP can be improved by 32% on a relative basis compared to directly applying SVMs from the TRECVID data.

Example 2

TRECVID 2007 to Kodak's Newer Set

Figure 8:
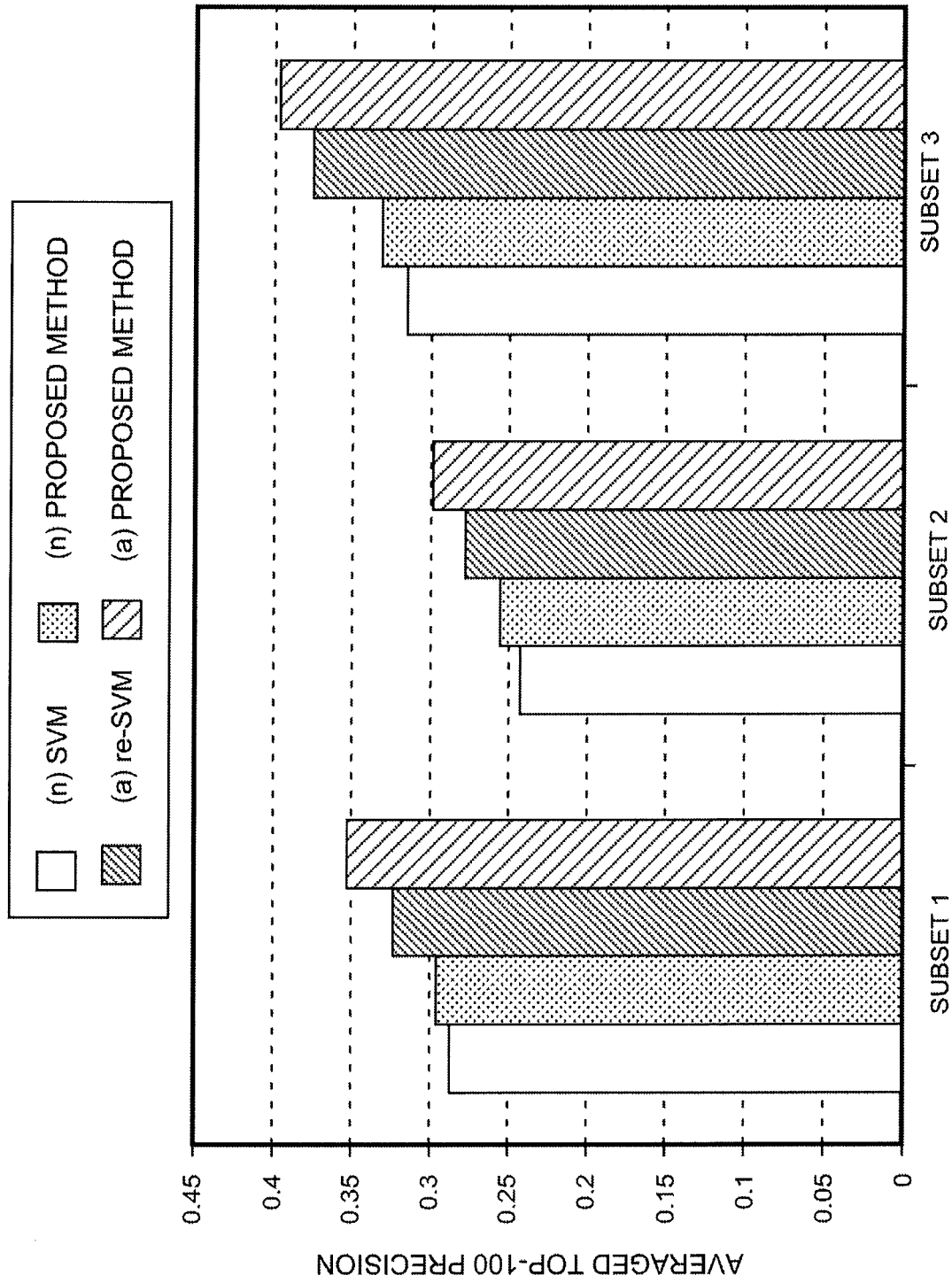
FIG. 8 shows the averaged-top-100-precision comparisons of the present invention and some other state-of-the-art alternatives where the first multimedia collection is the TRECVID 2007 development video set and the second multimedia collection is the large-scale Kodak's newer video set.

Classifiers and concept affinity relations from the TRECVID 2007 development data are further adapted to classify a large-scale Kodak's newer video set. Due to the large amount of videos in Kodak's newer video set, it can be partitioned into subsets to evaluate the incremental learning ability of the algorithm "Algorithm: preferred embodiment of the present invention with incrementally acquired new labeled data from the second multimedia collection". To this end, the entire Kodak's new video set is randomly partitioned into 3 subsets, and TRECVID-based classifiers and concept affinity relations are incrementally adapted over these 3 subsets. FIG. 8 shows the averaged top-100 precision performance comparison over different subsets. The results show that the incrementally updated semantic concept classifiers can outperform retrained SVM, i.e., better precision is obtained with less computational cost.

The invention has been described in detail with particular reference to certain preferred embodiments thereof, but it will be understood that variations and modifications can be effected within the spirit and scope of the invention.

PARTS LIST 110 processor
120 peripheral system
130 user interface system
140 data storage system
200 Multimedia Collection block
210 data affinity relation block
220 feature vectors block
230 1$^{st}$ Multimedia Collection block
240 1$^{st}$ Semantic Concept Classifiers block
250 concept affinity relations block
260 Adapting semantic concept classifiers and updating concept affinity relations without annotation from the second multimedia collection block
270 updated concept affinity matrix block
280 New Semantic Concept Classifiers block
290 getting semantic concept classification block
300 Adapting semantic concept classifiers and updating concept affinity relations with incrementally acquired annotations from the second multimedia collection block
310 selecting the data-concept pairs block
320 data-concept pairs block
330 Acquire Annotation block
340 labeled data-concept pairs block
400 updating semantic concept classifiers block
410 updated semantic concept classifiers during iteration block
420 updating concept affinity relations block
430 updated concept affinity relations during iteration block
600 Importance of Data block
610 Importance of Concepts block
620 single datum block
630 ranking data-concept pairs block

The invention claimed is:

1. A method of classifying a set of semantic concepts on a second multimedia collection based upon adapting a set of semantic concept classifiers and updating concept affinity relations that were developed to classify the set of semantic concepts for a first multimedia collection, comprising:
   a) providing the second multimedia collection from a different domain than the first multimedia collection;
   b) using a processor to automatically classify the semantic concepts from the second multimedia collection by adapting the semantic concept classifiers and updating the concept affinity relations to the second multimedia collection based upon the local smoothness over the concept affinity relations and the local smoothness over data affinity relations;
   c) wherein the local smoothness over the concept affinity relations includes a function to remain smooth over a weighted affinity graph connecting pairs of the semantic concepts and the weight over a graph edge is the concept affinity relation of the corresponding pair of concepts; and
   d) wherein the local smoothness over the data affinity relations includes a function to remain smooth over a weighted affinity graph connecting pairs of the multimedia data in the second multimedia collection and the weight over a graph edge is the data affinity relation of the corresponding pairs of multimedia data;
   e) storing the adapted semantic concept classifiers and the updated concept affinity relations.

2. The method of claim 1 where a multimedia collection includes both still and video data.

3. The method of claim 1 where step a) further includes automatically selecting a set of data-concept pairs to query users for annotation and step b) further includes using the annotated data-concept pairs to classify the semantic concepts from the second multimedia collection and to adapt the semantic concept classifiers and update the concept affinity relations.

4. The method of claim 3 where selecting a set of data-concept pairs includes considering importance of the multimedia data defined over the data affinity relations and importance of the semantic concepts defined over the concept affinity relations.

* * * * *